(12) United States Patent
Kusafuka et al.

(10) Patent No.: US 8,488,083 B2
(45) Date of Patent: Jul. 16, 2013

(54) IMAGE DISPLAY DEVICE WITH LIGHT SHIELDING WIRINGS AND COLOR FILTER HAVING RESISTIVITY RATIO

(75) Inventors: Kaoru Kusafuka, Kanagawa-ken (JP); Mitsuru Ikezaki, Kanagawa-ken (JP)

(73) Assignee: Chimei Innolux Corporation, Miao-Li County (TW)

(*) Notice: Subject to any disclaimer, the term of this patent is extended or adjusted under 35 U.S.C. 154(b) by 2069 days.

(21) Appl. No.: 11/005,874

(22) Filed: Dec. 7, 2004

(65) Prior Publication Data
US 2006/0017867 A1  Jan. 26, 2006

(30) Foreign Application Priority Data
Dec. 12, 2003 (JP) .................. 2003-415622

(51) Int. Cl.
*G02F 1/1335* (2006.01)
*G09G 3/36* (2006.01)

(52) U.S. Cl.
USPC ............ 349/106; 349/109; 349/141; 345/88

(58) Field of Classification Search
USPC ............... 349/106, 109, 141; 345/88
See application file for complete search history.

(56) References Cited

U.S. PATENT DOCUMENTS

| | | | | |
|---|---|---|---|---|
| 3,852,798 A | * | 12/1974 | Leabailly et al. | 257/85 |
| 5,844,644 A | * | 12/1998 | Oh et al. | 349/95 |
| 6,147,728 A | * | 11/2000 | Okumura et al. | 349/106 |
| 2002/0196393 A1 | * | 12/2002 | Tashiro et al. | 349/106 |
| 2003/0218703 A1 | * | 11/2003 | Huh et al. | 349/106 |
| 2004/0080684 A1 | * | 4/2004 | Rho | 349/106 |

FOREIGN PATENT DOCUMENTS

| | | |
|---|---|---|
| JP | 09160002 | 6/1997 |
| JP | 09211480 | 8/1997 |

* cited by examiner

*Primary Examiner* — Hoan C Nguyen
(74) *Attorney, Agent, or Firm* — Trop Pruner & Hu, P.C.

(57) ABSTRACT

An image display device, particularly an IPS mode LCD, includes a light source, an array substrate including a display region and a peripheral region around the display region, a color filter substrate including a plurality of color filters having different transmissivities, a liquid crystal layer including a plurality of liquid crystal molecules, and an alignment film for aligning the liquid crystal molecules. Characteristically, a light transmittance per unit area in the peripheral region is equivalent to or less than a light transmittance per unit area in the display region.

8 Claims, 7 Drawing Sheets

IMAGE DISPLAY DEVICE WITH LIGHT SHIELDING WIRINGS AND COLOR FILTER HAVING RESISTIVITY RATIO

BACKGROUND OF INVENTION

1. Field of the Invention

The present invention relates to an image display device, and more particularly, to an IPS (in-plane switching) mode LCD.

2. Description of the Prior Art

An image display device is an optoelectronic device able to transfer electric signals into visible images so that human beings can see the information contained in the electronic signals. These days, the typical image display device is commonly an LCD, and other display devices, such as a PDP (plasma display panel) display, an EL (electro luminescence) display, an FED (field emission display), and a DMD (deformable mirror device) display.

Among all those image display devices, an active matrix LCD, which utilizes thin film transistors as switching elements, is popular due to its small size, light weight, and low power consumption. The LCD substantially includes two glass substrates, a liquid crystal layer disposed between the two substrates, and two alignment films respectively disposed on two opposite surfaces of the two substrates for orientating liquid crystal molecules in predetermined directions. The liquid crystal molecules arranged in predetermined directions are rotated when an electric filed is applied, and thus images are displayed via light transmittance changes through the liquid crystal layer.

For known art, a TN (twisted nematic) mode LCD has been in use for a long time. In the TN mode LCD, the liquid crystal molecules are rotated in a vertical direction with respect to the substrate. However, this leads to problems of narrow viewing angles and color distortions.

In order to solve these problems, Japanese patent (publication No. 07-36058) has proposed an IPS mode LCD. In the Japanese patent, the IPS mode LCD includes a plurality of pixel electrodes and a plurality of common electrodes arranged in parallel to the pixel electrodes in an array substrate. A voltage is applied between the pixel electrode and the common electrode so that a parallel electric field, which rotates the liquid crystal molecules, is generated above the array substrate. Since the liquid crystal molecules are rotated in a plane approximately parallel to the array substrate, the problems of color distortions and narrow viewing angles are reduced. Therefore, the IPS mode LCD is suitable for use in large-sized displays.

For the IPS mode LCD, however, an uneven brightness defect occurs when a large-sized screen with fine image qualities is desired. Presumably, the uneven brightness defect results from the existence of impurity ions. FIG. 14 is a schematic diagram illustrating an image display condition of a conventional LCD. As shown in FIG. 14, when a white image is displayed in a display region 102, red color unevenness defects 104 appears around the display region 102. These red color unevenness defects 104 degrade the image quality of the IPS mode LCD.

SUMMARY OF INVENTION

It is therefore a primary object of the claimed invention to provide an image display device to prevent the aforementioned uneven brightness problem.

According to claim 1, an image display device is provided. The image display device includes a light source, an array substrate including a display region and a peripheral region around the display region, a color filter substrate including a plurality of color filters having different transmissivities, a liquid crystal layer including a plurality of liquid crystal molecules, and an alignment film for aligning the liquid crystal molecules. Characteristically, a light transmittance per unit area in the peripheral region is equivalent to or less than a light transmittance per unit area in the display region.

By virtue of the image display device recited in claim 1, the light transmittance per unit area in the peripheral region is equivalent to or less than a light transmittance per unit area in the display region, so as to inhibit impurity ions from traveling from the peripheral region to the display region. Consequently, the uneven brightness problem is reduced.

According to claim 2, the array substrate recited in claim 1 includes a first light-shielding wiring layout arranged in the display region, and a second light-shielding wiring layout arranged in the peripheral region. Characteristically, an occupied area per unit area of the second light-shielding wiring layout in the peripheral region is equivalent to or greater than an occupied area per unit area of the first light-shielding wiring layout in the display region.

According to claim 3, the image display device recited in claim 2, wherein the first light-shielding wiring layout and the second light-shielding wiring layout comprise at least one of an active element, a passive element, and a wiring.

According to claim 4, an image display device is disclosed. The image display device includes a light source, an array substrate including a display region and a peripheral region around the display region, a color filter substrate including a plurality of color filters having different transmissivities, a liquid crystal layer including a plurality of liquid crystal molecules, and an alignment film for aligning the liquid crystal molecules. Characteristically, a resistivity ratio of the color filter having a highest resistivity to the color filter having a lowest resistivity is set according to a difference between a light transmittance per unit area in the peripheral region and a light transmittance per unit area in the display region.

By virtue of the image display device recited in claim 4, the resistivity ratio of the color filter having the highest resistivity to the color filter having the lowest resistivity is set according to the difference between the light transmittance per unit area in the peripheral region and the light transmittance per unit area in the display region, so as to inhibit impurity ions from traveling from the peripheral region to the display region. Consequently, the uneven brightness problem is reduced.

According to claim 5, the relation between the resistivity ratio of the color filter having the highest resistivity to the color filter having the lowest resistivity and the difference between the light transmittance per unit area in the peripheral region and the light transmittance per unit area in the display region is expressed by $$\rho_{max}/\rho_{min} < 10^{(4100/(I_f - I_p) + 0.05)}$$

wherein $\rho_{max}$ is the highest resistivity having units of $\Omega \cdot cm$;

$\rho_{min}$ is the lowest resistivity having units of $\Omega \cdot cm$;

$I_f$ is the light transmittance in the peripheral region having units of cd/mm; and $I_p$ is the light transmittance in the display region having units of cd/mm.

According to claim 6, an image display device is provided. The image display device includes a light source, an array substrate including a display region and a peripheral region around the display region, a color filter substrate including a plurality of color filters having different transmissivities, a liquid crystal layer including a plurality of liquid crystal molecules, and an alignment film for aligning the liquid crystal molecules. Characteristically, the alignment film is only positioned in the display region.

By virtue of the image display device recited in claim 6, the alignment film is only positioned in the display region, so that the uneven brightness problem due to the contamination of impurity ions coming from the peripheral region is prevented.

According to claim 7, the image display device is an IPS mode LCD.

The image display device reduces electric filed deviations due to impurity ions by means of controlling the extension of impurity ions. As a result, the image display device is able to exhibit high quality images without suffering the red color unevenness phenomenon.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
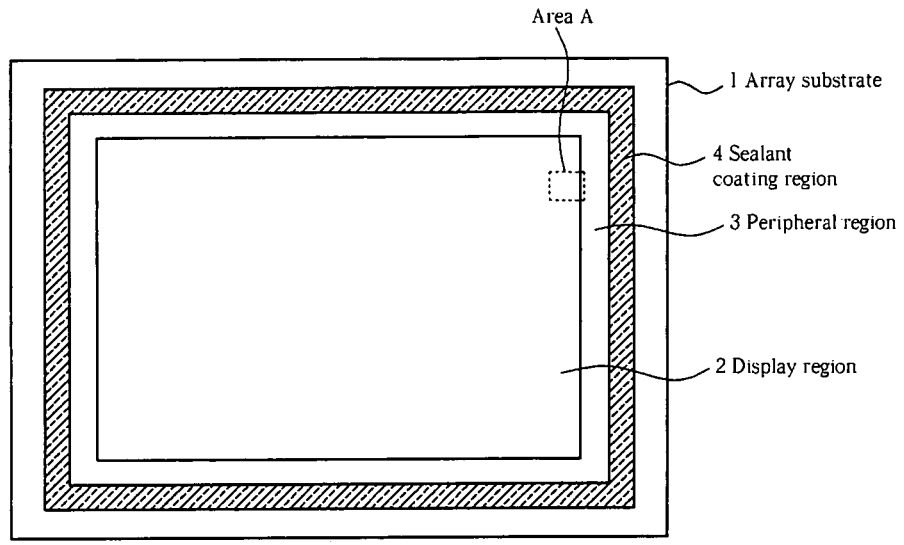
FIG. 1 is a top view of an array substrate of an LCD according to Embodiment 1.

Please refer to the drawings of the present invention. In the embodiments, an IPS mode LCD is merely an example, but not a limitation to the present invention. In the drawings, like elements are denoted by like numerals. In addition, the drawings are schematic diagrams, and therefore the dimensions and ratios of components may not be identical to real ones.

[Embodiment 1]

In Embodiment 1, an occupied area per unit area of wirings in the peripheral region is either approximately equivalent to or greater than an occupied area per unit area of wirings in the display region for adjusting the light transmittance passing through the display region and the peripheral region. This inhibits the movement of impurity ions that is presumed to cause the uneven brightness defect.

FIG. 1 is a top view of an array substrate of an LCD according to Embodiment 1. As shown in FIG. 1, an array substrate 1 includes a display region 2 composed of a plurality of pixels (not shown) and a peripheral region 3 having a plurality of input terminals (not shown) for receiving external electric signals. The array substrate 1 further includes a sealant coating region 4 in which a sealant is coated thereon. The peripheral region 3 is positioned between the display region 2 and the sealant coating region 4.

Figure 2:
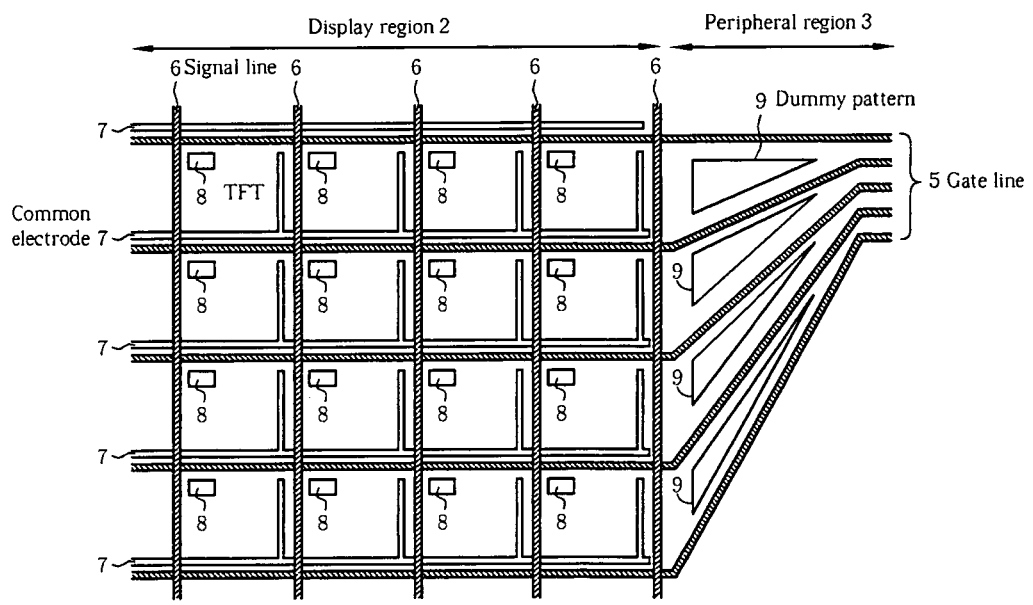
FIG. 2 is a schematic diagram of a wiring layout in an area A shown in FIG. 1.

FIG. 2 is a schematic diagram of wirings disposed in an area A shown in FIG. 1. As shown in FIG. 2, gate lines 5 and signal lines 6 are arranged in a matrix, and each pixel includes a TFT 8. Since the LCD is an ISP mode LCD, the LCD includes a plurality of pixel electrodes (not shown) and a plurality of common electrodes 7 positioned in line with the pixel electrodes. In addition, the gate lines 5 are extended to connect input terminals (not shown) in the peripheral region 3. Besides, there is a plurality of dummy patterns 9 in the peripheral region 3. The dummy patterns 9 are used to adjust the occupied area of the wirings so that the occupied area of the wirings per unit area in the peripheral region 3 (hereinafter referred to as $S_f$) is approximately equivalent to or greater than the occupied area of the wirings per unit area in the display region 2 (hereinafter referred to as $S_p$). The wirings include not only the gate lines 5, the signal lines 6, the common electrodes 7, and the pixel electrodes, but also the TFTs 8, passive elements (e.g. capacitors), and the dummy patterns 9. The function of the dummy patterns 9 is to adjust the occupied areas $S_f$ and $S_p$, thus the dummy patterns 9 are light shielding, and the line width of the dummy patterns 9 is not necessarily identical to other wirings disposed in the peripheral region 3.

Figure 3:
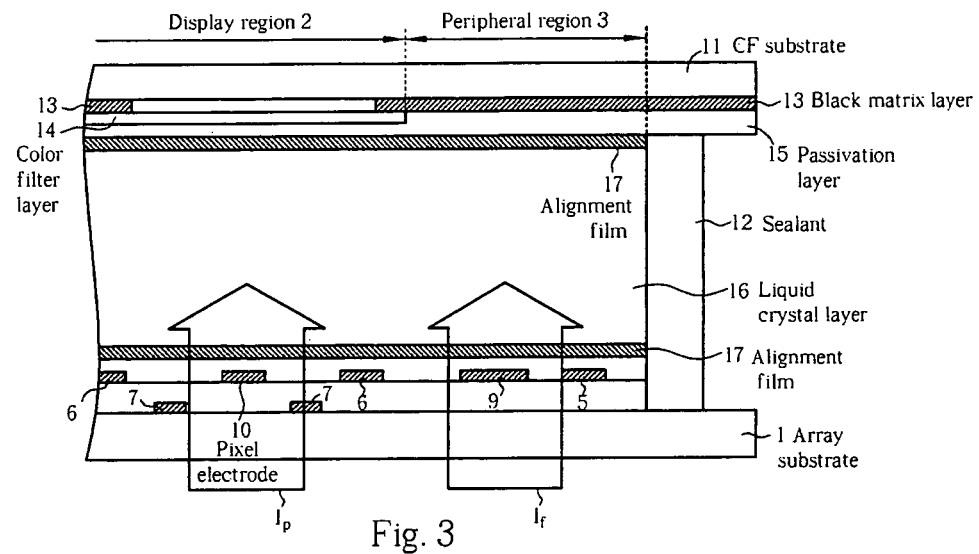
FIG. 3 is a cross-sectional view of the LCD of Embodiment 1.

FIG. 3 is a cross-sectional view of the LCD of Embodiment 1. As shown in FIG. 3, an array substrate 1 and a CF (color filter) substrate 11 are bonded together with a sealant 12. A liquid crystal layer 16 including liquid crystal molecules is filled between the array substrate 1 and the CF substrate 11. The CF substrate 11 includes a BM (black matrix) layer 13, a color filter layer 14 including a plurality of color filters having different transmissivities, and a passivation layer 15. The LCD further includes two alignment films 17 respectively positioned on the surface of the array substrate 1 and the surface of the CF substrate 11 in contact with the liquid crystal molecules, so as to orientate the liquid crystal molecules. The array substrate 1 includes a plurality of common electrodes 7, signal lines 6, and pixel electrodes 10 in the display region 2. By applying a voltage to the common electrode 7 and the pixel electrode 10, an electric field parallel to the array substrate 1 is generated between the common electrodes 7 and the pixel electrodes 10. Consequently, the liquid crystal molecules of the liquid crystal layer 16 rotate. In addition, the array substrate 1 further includes gate lines 5 and dummy patterns 9 in the peripheral region 3.

Generally, the light coming from a light source of a backlight unit (not shown) evenly enters the liquid crystal layer 16 through the array substrate 1. With the dummy patterns 9, that make the occupied area $S_f$ approximately equivalent to or larger than the occupied area $S_p$, disposed in the peripheral region 3, a light transmittance per unit area in the peripheral region 3 (hereinafter referred to as $I_f$) is equivalent to or less than a light transmittance per unit area in the display region 2 (hereinafter referred to as $I_p$). By making $I_f$ equal to or smaller than $I_p$, the uneven brightness defect due to the movement of impurity ions towards the display region 2 is inhibited. The reason for the reduction of the uneven brightness defect is detailed in the following.

The red color unevenness defect is inferred to be from impurity ions while the LCD is operating. Specifically, the emission of the impurity ions from the peripheral region to the liquid crystal layer is driven by backlight unit illumination. The higher the light transmittance is, the more impurity ions enter the liquid crystal layer. The accumulation of the impurity ions in the display region leads to the red color unevenness defect.

Therefore, upon close inspection of the cause of the red color unevenness defect, an experimental result is obtained. Please refer to Table 1. Table 1 shows an experimental result of a conventional LCD in sequence from 1 to 3 after applying a voltage to each wiring or/and lighting up the light source to examine if the red color unevenness defect appears in the display region when displaying a white image. It is important to note that the conventional LCD does not include dummy patterns in the peripheral region, and therefore the occupied area $S_f$ is smaller than the occupied area $S_p$. In addition, all results are from experiments at 50 degrees Celsius for 100 hours. In Experiment 1, each wiring is applied with a voltage, and the light source is off. Subsequently, the voltage applied to the wirings is ceased, and the light source is on for Experiment 2. Following that, a voltage is applied to each wiring again, and the backlight is off for Experiment 3.

TABLE 1

| Experiment | Voltage | Light source | Red color unevenness defect |
|---|---|---|---|
| 1 | On | Off | No |
| 2 | Off | On | No |
| 3 | On | Off | Yes |

As shown in Table 1, the red color unevenness defect while displaying a white image does not appear in Experiment 1. In Experiment 1, a voltage is applied to the wirings for generating an electric filed, and the light source is off. Presumably the electric filed is not the cause of the red color unevenness defect. The red color unevenness defect while displaying a white image also does not appear in Experiment 2. In Experiment 2, the light source, which is inferred to cause the emission of impurity ions, is on, however, the red color unevenness does not appear. The explanation for this experimental result is that the amount of impurity ions may not cause the red color unevenness defect in the display region.

Figure 4:
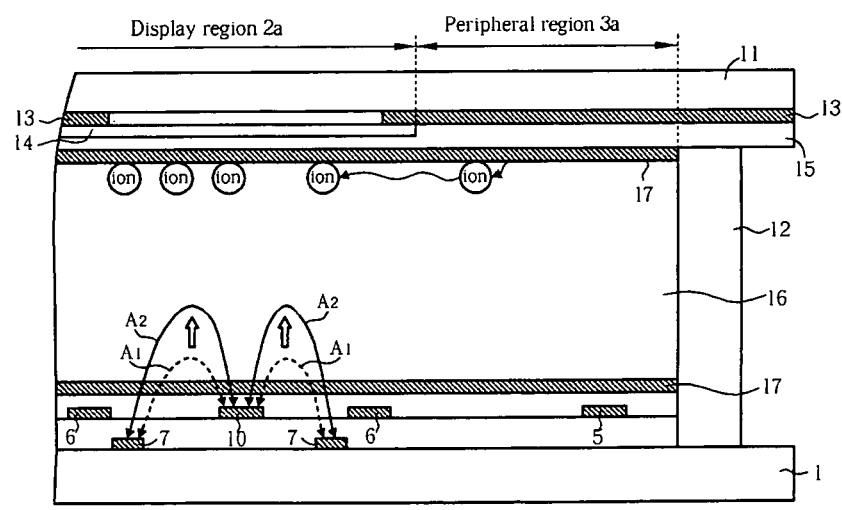
FIG. 4 is a schematic diagram illustrating variations of electric field magnitude of the conventional LCD.

On the other hand, the red color unevenness defect does appear while displaying a white image in Experiment 3. Thus, the presence of the red color unevenness defect is inferred to be caused by the movement of impurity ions induced in Experiment 2 into the display region under the effect of the electric filed. In the conventional LCD, the occupied area $S_f$ is less than the occupied area $S_p$, meaning the light transmittance $I_f$ is greater than the light transmittance $I_p$. Therefore, In Experiment 2, the majority of the impurity ions due to the backlight exist in the peripheral region. In Experiment 3, the electric filed drives the impurity ions to move into the display region. FIG. 4 is a schematic diagram illustrating variations of electric field magnitude of the conventional LCD. As shown in FIG. 4, impurity ions emitted from a peripheral region 3a slowly move to a display region 2a, and accumulate on the surface of the CF substrate 11 facing the array substrate 1. These accumulated impurity ions result in electric deflections, and disturb the electric filed while displaying an image. For instance, if the electric filed has a desired magnitude of $A_1$ as shown in FIG. 4, the accumulated impurity ions disturb the electric field, making the electric field have an actual magnitude of $A_2$. The disorder of the electric field further deranges the alignment of the liquid crystal molecules of the liquid crystal layer 16. Consequently, the brightness is partially reduced, and the red color unevenness defect therefore appears when displaying a white image.

In Embodiment 1, the occupied area $S_f$ is either equivalent to or greater than the occupied area $S_p$. In the case that the occupied area $S_f$ is equivalent to the occupied area $S_p$, the light transmittance $I_f$ is approximately equivalent to the light transmittance $I_p$. Namely, the emitted impurity ions are about equal in the display region 2 and in the peripheral region 3. Therefore, the distributions of impurity ions in the display region 2 and the peripheral region 3 are approximately equal. In other words, few impurity ions travel from the peripheral region 3 towards the display region 2, and thus electric deflections do not occur. In addition, in the case that the occupied area $S_f$ is greater than the occupied area $S_p$, the light transmittance $I_f$ is less than the light transmittance $I_p$. This means the emitted impurity ions in the peripheral region 3 are even fewer than in the display region 2. In that case, the impurity ions in the peripheral region 3 do not move towards the display region 2 even when a voltage is applied to each wiring. Consequently, the electric deflections do not show up.

In Embodiment 1, the variations of the electric field never happens even though a voltage is applied to the common electrodes 7 and the pixel electrodes 10 and the light source is turned on. As a result, high-quality display images without the occurrence of the red color unevenness defect is realized when displaying a white image.

Figure 5:
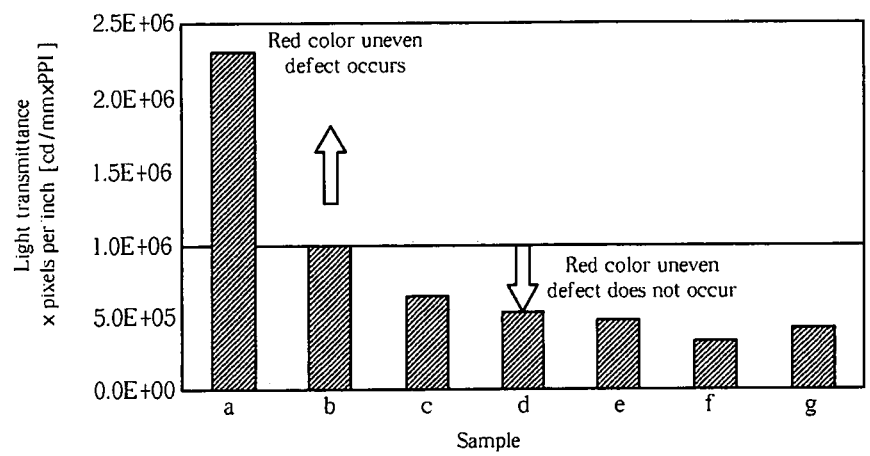
FIG. 5 is a schematic diagram illustrating whether the red color unevenness defect happens to LCDs having different ratios of occupied area $S_f$ to occupied area $S_p$ while displaying a white image.

FIG. 5 is a schematic diagram illustrating whether the red color unevenness defect happens to LCDs having different ratios of occupied area $S_f$ to occupied area $S_p$ while displaying a white image. In FIG. 5, the longitudinal axis represents a product of light transmittance and pixel numbers per inch. The higher the product is, the higher the difference between the occupied area $S_p$ and the occupied area $S_f$ is. Samples a to g are ranked by the ratio of the occupied area $S_f$ to the occupied area $S_p$, in which samples a and b have an occupied area $S_f$ less than an occupied area $S_p$, and samples c, d, e, f, and g have an occupied area $S_f$ equivalent to or greater than an occupied area $S_p$.

As shown in FIG. 5, the red color unevenness defect occurs when displaying a white image in samples a and b having occupied area $S_f$ less than occupied area $S_p$. On the other hand, the red color unevenness defect does not occur when displaying a white image in samples c, d, e, f, and g having occupied area $S_f$ equivalent to or greater than occupied area $S_p$. This result is consistent with the assumption recited earlier. For cases in which the occupied area $S_f$ is equivalent to or greater than the occupied area $S_p$, the distributions of impurity ions in the display region 2 and the peripheral region 3 are approximately equal, and few impurity ions travel from the peripheral region 3 towards the display region 2. Thus, the electric deflections, which incur the red color unevenness defect, do not occur.

Accordingly, Embodiment 1 modifies the light transmittance If to be approximately equal to or less than the light transmittance $I_p$ by virtue of adjusting the occupied area $S_f$ approximately to be equal to or greater than the occupied area $S_p$. Consequently, the amount of the impurity ions traveling from the peripheral region 3 to the display region 2 due to light irradiation is inhibited. In this case, the red color unevenness defect when displaying a white image, and the uneven brightness problem are both reduced. This enables the LCD according to Embodiment 1 to display high-quality images.

According to Embodiment 1, the dummy patterns 9 are positioned in the peripheral region 3 so that the occupied area $S_f$ is equal to or greater than the occupied area $S_p$. However, the present invention is not limited to Embodiment 1, and the occupied area $S_f$ can also be modified by enlarging the line width of the gate lines 5 or the signal lines 6 in the peripheral region 3. In this case, the light transmittance $I_f$ is also equivalent to or less than the light transmittance $I_p$, so as to inhibit impurity ions from moving from the peripheral region 3 to the display region 2. Accordingly, the red color unevenness defect when displaying a white image is reduced.

[Embodiment 2]

In Embodiment 1, the movement of the impurity ions from the peripheral region towards the display region is prohibited by virtue of adjusting the occupied area $S_f$ in the peripheral region and the occupied area $S_p$ in the display region. In Embodiment 2, on the other hand, a resistivity ratio of the color filter layer is modified to prevent the impurity ions in the display region from partially deviating, so that the red color unevenness defect is reduced.

Figure 6:
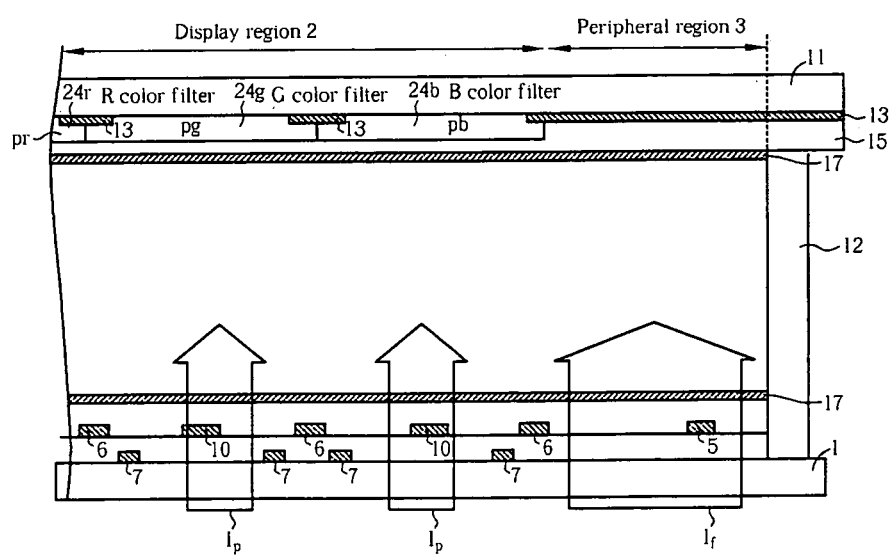
FIG. 6 is a cross-sectional view of an LCD according to Embodiment 2.

FIG. 6 is a cross-sectional view of an LCD according to Embodiment 2. As shown in FIG. 6, dummy patterns are not provided in the peripheral region 3. Therefore, the light transmittance $I_f$ in the peripheral region 3 is greater than the light transmittance $I_p$ in the display region 2. In addition, the color filter layer includes a plurality of R (red) color filters 24r having a resistivity r, G (green) color filters 24g having a resistivity g, and B (blue) color filters 24b having a resistivity b. In Embodiment 2, a resistivity ratio of the lowest resistivity color filter to the highest resistivity color filter (hereinafter referred to as resistivity ratio) is set in view of the difference of the light transmittance $I_p$ and the light transmittance $I_f$ as shown in the following equation (1):

$$\rho_{max}/\rho_{min} \leq 10^{(4100/(I_f-I_p)+0.05)} \quad (1)$$

wherein $\rho_{max}$ is the highest resistivity having units of Ω·cm; and $\rho_{min}$ is the lowest resistivity having units of Ω·cm.

Figure 7:
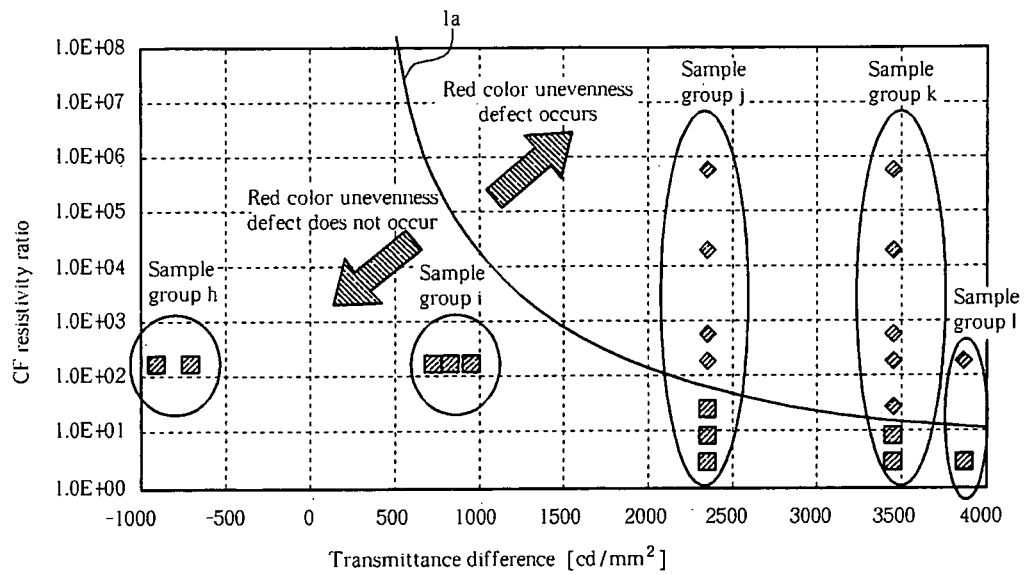
FIG. 7 is a schematic diagram illustrating whether the red color unevenness defect happens to LCDs having different light transmittance differences ($I_f$-$I_p$) and different resistivity ratios while displaying a white image.

FIG. 7 is a schematic diagram illustrating whether the red color unevenness defect happens to LCDs having different light transmittance differences $(I_f-I_p)$ and different resistivity ratios while displaying a white image. In FIG. 7, sample groups h to l represent LCDs having different light transmittance differences $(I_f-I_p)$ and different resistivity ratios. As shown in FIG. 7, with regard to sample group h, the difference between $I_f$ and $I_p$ is negative, and the red color unevenness defect does not occur when displaying a white image. This supports the conclusion of Embodiment 1 that the movement of impurity ions from the peripheral region to the display region is inhibited when the light transmittance $I_f$ is less than the light transmittance $I_p$.

As for sample groups i, j, k, and l, each of these has a positive light transmittance difference. In addition, curve 1a is a boundary: the red color unevenness defect occurs over curve 1a, and it does not occur under curve 1a. In conclusion, to inhibit the red color unevenness defect, the relation between the light transmittance difference and the resistivity ratio has to fulfill equation (1).

In practice, sometimes the resistivity ratio of the color filter layer is higher if different materials are adopted. For a higher resistivity ratio, the light transmittance difference must be set in accordance with equation (1), so as to inhibit the red color unevenness defect. Therefore, Table 2 illustrates the occupied area difference $(S_f-S_p)$ and the light transmittance difference $(I_f-I_p)$ of sample groups h, i, j, k, and l.

TABLE 2

|  | Occupied area difference | Light transmittance difference [cd/m²] |
|---|---|---|
| Sample group h | −0.17 | −930 |
|  | −0.13 | −730 |
| Sample group i | 0.09 | 730 |
|  | 0.12 | 800 |
|  | 0.14 | 950 |
| Sample group j | 0.32 | 2300 |
| Sample group k | 0.39 | 3500 |
| Sample group l | 0.46 | 3800 |

Accordingly, the occupied area difference and the light transmittance difference are roughly proportional. Therefore, for a known resistivity ratio, the occupied area difference, which represents the light transmittance difference, can be modified to meet equation (1), so as to reduce the red color unevenness defect. In addition, even though the light transmittance difference is inevitably higher due to circuit design requirements, the red color unevenness defect when displaying a white image still can be reduced by selecting different materials for the color filter layer.

Figure 8:
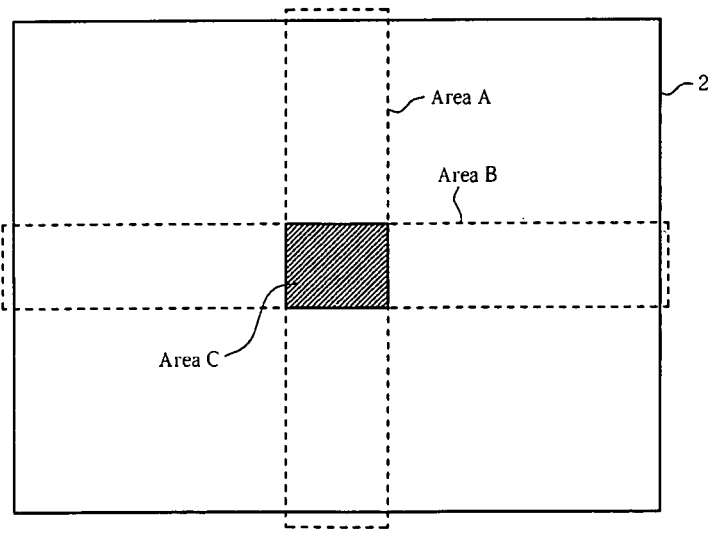
FIG. 8 is a schematic diagram illustrating areas being heated and shielded in the display region.

The relation between the resistivity ratio, the light transmittance difference, and the occurrence of the red color unevenness defect is detailed in the following. For ensuring variations of brightness in each pixel, which is assumed to be the cause of the red color unevenness defect, the display region of a conventional LCD is first heated and shielded in predetermined areas. FIG. 8 is a schematic diagram illustrating areas heated and shielded from light in the display region 2. In FIG. 8, an area A is heated to a temperature ranging from 55 to 75 degrees Celsius, and the area outside the area A is maintained at a temperature ranging from 25 to 35 degrees Celsius. In addition, an area B is a light-shielded area. Therefore, an area C where the area A and the area B overlap is heated and light-shielded. Subsequently, the brightness in the area A and the area C of R pixels, G pixels, and B pixels are measured. In the G pixels, a brightness reduction is observed. Table 3 shows the brightness $Y_G$ of the area A and the area C in the G pixels.

TABLE 3

| Area | Light-shielded | Heated | Brightness $Y_G$ [cd/m²] |
|---|---|---|---|
| A | No | Yes | 133 |
| C | Yes | Yes | 150 |

As shown in Table 3, compared to the area C that is heated and light-shielded, a brightness $Y_G$ reduction in the area A is observed. This result shows that the impurity ions caused by the backlight particularly accumulate in the G pixels, rather than in the R pixels and the B pixels. As a result, the brightness $Y_G$ in the G pixels is reduced, causing the red color unevenness defect while displaying a white image.

Figure 9:
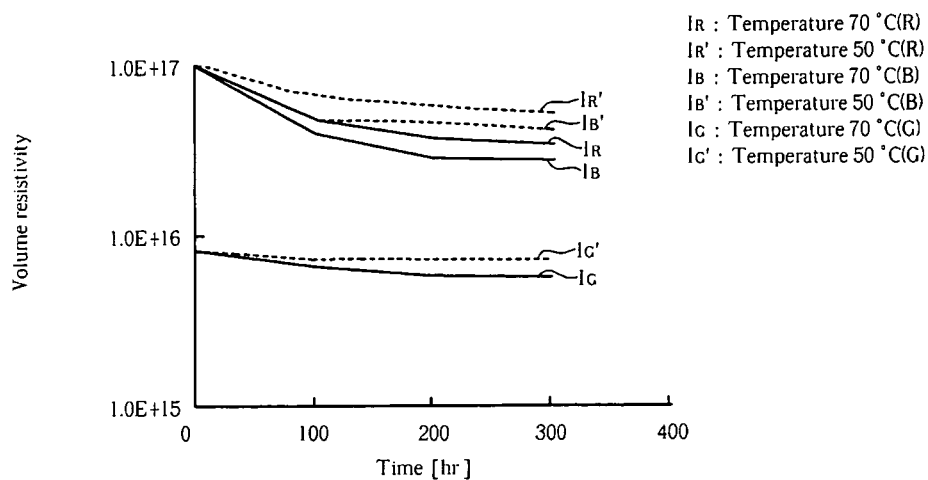
FIG. 9 is a schematic diagram illustrating a relation between the volume resistivity and time in the R pixels, G pixels, and B pixels of a conventional LCD at a humidity of 85%.

Therefore, to determine the differences between the R pixels, B pixels, and G pixels, volume resistivities of the R pixels, G pixels, and B pixels can be measured to reveal a significant difference. FIG. 9 is a schematic diagram illustrating a relation between the volume resistivity and time in the R pixels, G pixels, and B pixels of a conventional LCD at a humidity of 85%. Volume resistivity is the resistivity divided by the thickness of the color filter layer in cm. Curves $I_R$ and $I_R'$ illustrate the variations of an R color filter with time. Curves $I_G$ and $I_G'$ illustrate the variations of a G color filter with time. Curves $I_B$ and $I_B'$ illustrate the variations of a B color filter with time. Curves $I_R$, $I_G$, and $I_B$ are measured at 70 degrees Celsius, and curves $I_R'$, $I_G'$, and $I_B'$ are measured at 50 degrees Celsius. As illustrated by curves $I_G$ and $I_G'$, the G color filter is irrelevant to the atmosphere. In addition, compared to the R color filter and the B color filter, the volume resistivity of the G color filter is one tenth that of the R color filter or the B color filter. Since the thickness of each color filter is about equal, and so is the area of each pixel, the resistivity of the G color filter, compared to that of the R color filter and the B color filter, is dramatically reduced.

Figure 10:
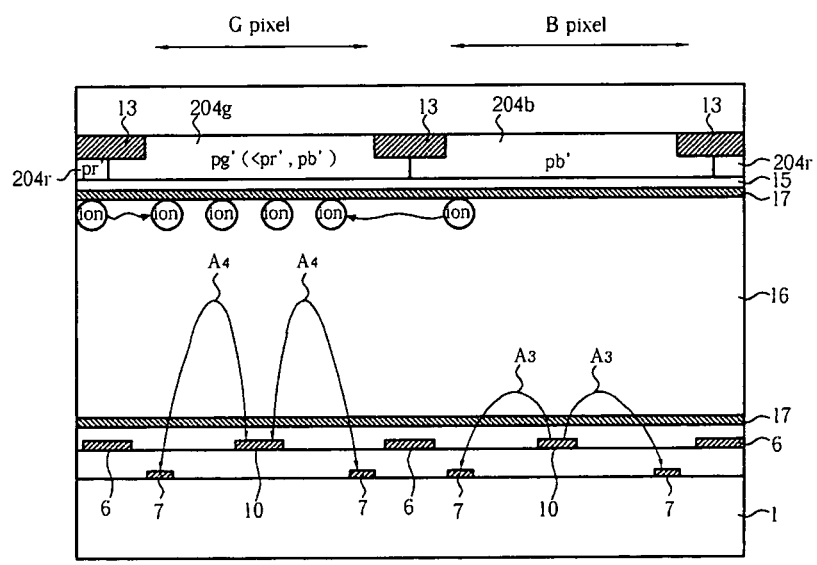
FIG. 10 is a schematic diagram illustrating variations of electric field magnitude of the conventional LCD.

As shown in FIG. 9, due to the accumulation of impurity ions, the resistivity of the G color filter, compared to that of the R color filter and the B color filter, is reduced greatly. Therefore, it is assumed that the accumulated impurity ions are relevant to the resistivity of the pixel having the accumulated impurity ions therein. Specifically, the impurity ions tend to accumulate in pixels with low resistivity. FIG. 10 is a schematic diagram illustrating variations of electric field magnitude of the conventional LCD. As shown in FIG. 10, in the conventional LCD, the light transmittance $I_f$ is greater than the light transmittance $I_p$, and impurity ions generated in the peripheral region tend to move to the display region of the G color filter, which has a low resistivity $204g$, instead of the R color filter having a higher resistivity $204r$ or the B color filter having a higher resistivity $204b$. In that case, when a voltage is applied to each wiring for generating an electric field, the electric field in a B pixel has a magnitude $A_3$, while the electric field in a G pixel has an actual magnitude $A_4$ under the influence of the impurity ions. Impurity ions lead to disorder in the liquid crystal molecules, thereby causing brightness reduction and the red color unevenness defect. Based on the above assumption, the accumulation of impurity ions can be reduced by diminishing the resistivity ratio of the color filters.

In Embodiment 2, the light transmittance difference and the resistivity ratio have the relation as expressed in equation (1). Therefore, to prevent the accumulation of impurity ions in the display region 2, reducing the resistivity ratio is a useful approach. Accordingly, the local brightness reduction problem is improved, and so is the red color unevenness defect. In addition, if the resistivity ratio is inevitably high due to the material characteristics of the color filters, adjusting the occupied area difference of the wirings to meet equation (1) is another approach to reduce the red color unevenness defect. In conclusion, high-quality images without the red color unevenness defect can be obtained by adjusting the resistivity ratio and the occupied area difference according to Embodiment 2.

Furthermore, the relation between the resistivity ratio and the light transmittance difference is defined by equation (1) in Embodiment 2, but the present invention is not limited by equation (1) if different materials are adopted for making the LCD. The essence of the present invention is to reduce the red color unevenness defect while displaying a white image either by adjusting the resistivity ratio according to the light transmittance difference, or adjusting the light transmittance difference according to the resistivity ratio.

[Embodiment 3]

In both Embodiment 1 and Embodiment 2, the red color unevenness defect is reduced by inhibiting the move and the accumulation of the impurity ions. In Embodiment 3, on the other hand, the red color unevenness defect is reduced by reducing emissions of the impurity ions.

Figure 11:
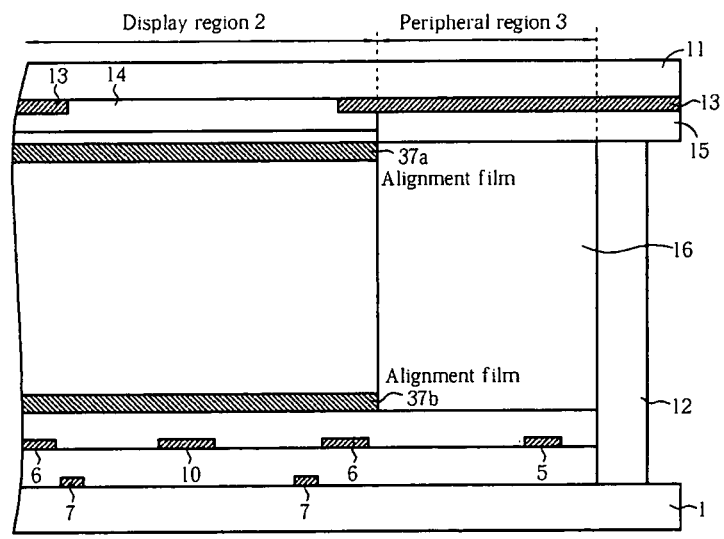
FIG. 11 is a cross-sectional view of an LCD according to Embodiment 3.
Figure 12:
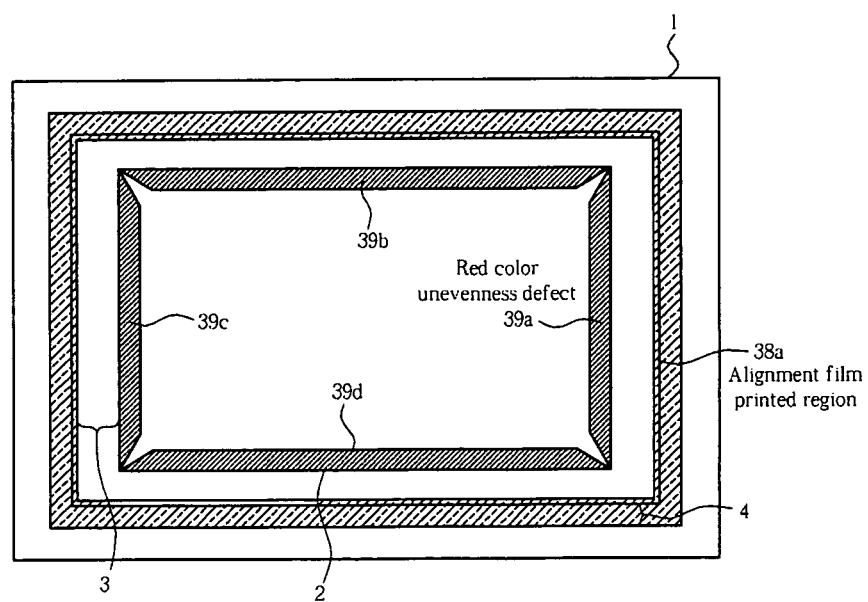
FIG. 12 is a schematic diagram illustrating an array substrate of a conventional LCD with an alignment printed region.
Figure 13:
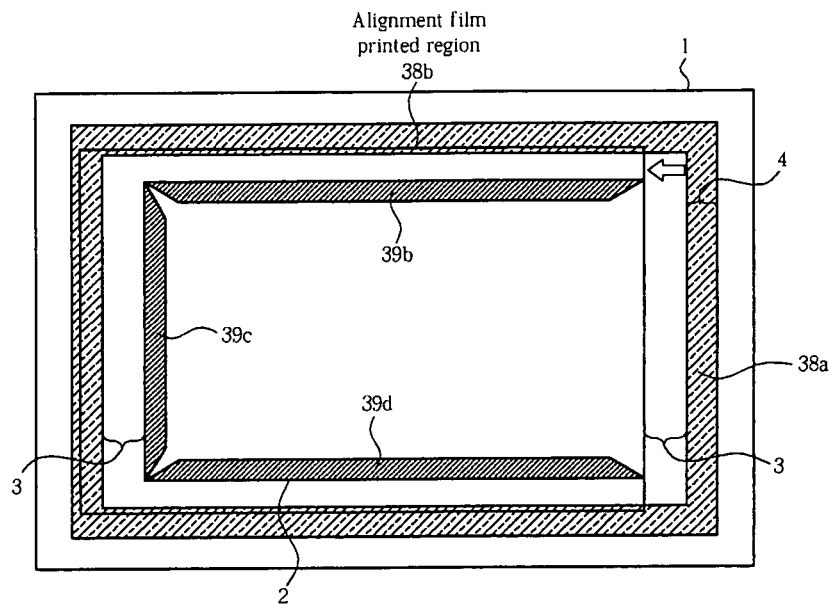
FIG. 13 is a schematic diagram illustrating the array substrate shown in FIG. 12.
Figure 14:
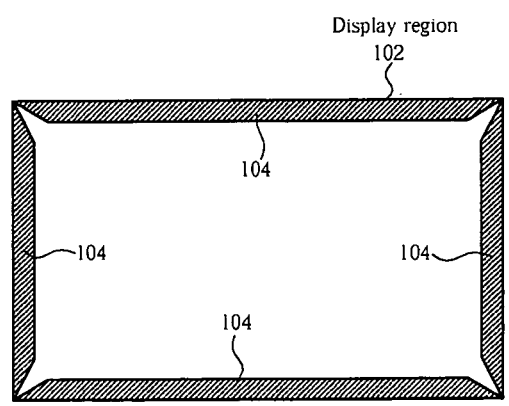
FIG. 14 is a schematic diagram illustrating an image display condition of a conventional LCD.

FIG. 11 is a cross-sectional view of an LCD according to Embodiment 3. As shown in FIG. 11, alignment films $37a$ and $37b$ are only formed in a display region 2, rather than in a peripheral region 3. FIG. 12 is a schematic diagram illustrating an array substrate 1 of a conventional LCD with an alignment printed region $38a$. As shown in FIG. 12, an alignment film (not shown) is printed within the alignment film printed region $38a$, which covers the display region 2 and the peripheral region 3, on an array substrate 1. Red color unevenness defects $39a$ to $39d$ occur around the display region 2. FIG. 13 is a schematic diagram illustrating the array substrate 1 shown in FIG. 12. As shown in FIG. 13, the alignment film printed region $38a$ is shifted leftward, forming a new alignment film printed region $38b$. In addition, a CF substrate (not shown) also includes a corresponding alignment film printed region (not shown). It can seen in FIG. 13 that the red color unevenness defects $39b$, $39c$, and $39d$ occur in the upper, lower, and left sides, but not in the right side of the display region 2. Therefore, the alignment film is construed as a cause of the emission of impurity ions.

The alignment films $37a$ and $37b$, which are assumed to be the cause of the emission of impurity ions, are only formed in the display region 2 in Embodiment 3, so as to inhibit the emission of impurity ions. This is different from Embodiment 1 and Embodiment 2 in which the impurity ions are inhibited from moving from the peripheral region 3 towards the display region 2. Therefore, the LCD has a reduction in the uneven brightness problem and the red color unevenness defect.

In summary, the LCDs of Embodiment 1, Embodiment 2, and Embodiment 3 of the present invention inhibit the movement, accumulation, or generation of impurity ions, and thus reduce the red color unevenness defect due to the brightness reduction in green pixels being prevented. Furthermore, the brightness reduction in red pixels and blue pixels can also be avoided. Consequently, high-quality images without uneven brightness can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An image display device comprising:
   a light source;
   an array substrate comprising a display region and a peripheral region around the display region, wherein the array substrate comprises:
     a first light-shielding wiring layout arranged in the display region of the array substrate; and
     a second light-shielding wiring layout arranged in the peripheral region of the array substrate, an occupied area per unit area of the second light-shielding wiring layout in the peripheral region being equal to or greater than an occupied area per unit area of the first light-shielding wiring layout in the display region, wherein the second light-shielding wiring layout includes dummy patterns formed on the array substrate in the peripheral region, the dummy patterns to adjust the occupied area per unit area of the second light-shielding wiring layout to be equal to or greater than the occupied area per unit area of the first light-shielding wiring layout;
   a color filter substrate comprising a plurality of color filters having different transmissivities;
   a liquid crystal layer comprising a plurality of liquid crystal molecules; and
   an alignment film for orientating the liquid crystal molecules;

wherein a light transmittance per unit area in the peripheral region of the array substrate is equal to or less than a light transmittance per unit area in the display region of the array substrate.

2. The image display device of claim 1, wherein the first light-shielding wiring layout and the second light-shielding wiring layout comprise at least one of an active element, a passive element, and a wiring.

3. The image display device of claim 1, wherein the image display device is an IPS (in-plane switching) mode LCD (liquid crystal display).

4. The image display device of claim 1, wherein the liquid crystal layer is disposed between the array substrate and the color filter substrate, and wherein light passing from the light source through the array substrate to the liquid crystal layer is subject to the light transmittance per unit area in the peripheral region and the light transmittance per unit area in the display region.

5. The image display device of claim 4, wherein the color filter substrate has a black matrix (BM) layer that is spaced apart from the array substrate by at least the liquid crystal layer.

6. An image display device comprising:
a light source;
an array substrate comprising a display region and a peripheral region around the display region;
a color filter substrate comprising a plurality of color filters having different resistivities;
a liquid crystal layer comprising a plurality of liquid crystal molecules; and
an alignment film for orientating the liquid crystal molecules;
wherein a resistivity ratio of the color filter having a highest resistivity to the color filter having a lowest resistivity is set according to a difference between a light transmittance per unit area in the peripheral region and a light transmittance per unit area in the display region.

7. The image display device of claim 6, wherein the image display device is an IPS (in-plane switching) mode LCD (liquid crystal display).

8. An image display device comprising:
a light source;
an array substrate comprising a display region and a peripheral region around the display region;
a color filter substrate comprising a plurality of color filters having different resistivities;
a liquid crystal layer comprising a plurality of liquid crystal molecules; and
an alignment film for orientating the liquid crystal molecules;
wherein a resistivity ratio of the color filter having a highest resistivity to the color filter having a lowest resistivity is set according to a difference between a light transmittance per unit area in the peripheral region and a light transmittance per unit area in the display region,
wherein the relation between the resistivity ratio of the color filter having the highest resistivity to the color filter having the lowest resistivity and the difference between the light transmittance per unit area in the peripheral region and the light transmittance per unit area in the display region is expressed by:

$$\rho_{max}/\rho_{min} < 10^{(4100/(I_f - I_p) + 0.05)}$$

wherein $\rho_{max}$ is the highest resistivity;
$\rho_{min}$ is the lowest resistivity;
$I_f$ is the light transmittance in the peripheral region; and
$I_p$ is the light transmittance in the display region.

* * * * *